(12) United States Patent
Jeong et al.

(10) Patent No.: US 11,424,475 B2
(45) Date of Patent: Aug. 23, 2022

(54) APPARATUS FOR FOLDING POUCH FOR SECONDARY BATTERY

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 217 days.

(21) Appl. No.: 16/928,608

(22) Filed: Jul. 14, 2020

(65) Prior Publication Data
US 2021/0280893 A1 Sep. 9, 2021

(30) Foreign Application Priority Data
Mar. 4, 2020 (KR) .................. 10-2020-0027191

(51) Int. Cl.
| | |
|---|---|
| *H01M 10/04* | (2006.01) |
| *H01M 10/647* | (2014.01) |
| *H01M 50/116* | (2021.01) |
| *H01M 50/105* | (2021.01) |

(52) U.S. Cl.
CPC ..... *H01M 10/045* (2013.01); *H01M 10/0404* (2013.01); *H01M 10/647* (2015.04); *H01M 50/105* (2021.01); *H01M 50/116* (2021.01)

(58) Field of Classification Search
CPC .... H01M 4/0404; H01M 4/045; H01M 4/647; H01M 4/058; H01M 50/105; H01M 50/116
See application file for complete search history.

(56) References Cited

FOREIGN PATENT DOCUMENTS

| KR | 10-2017-0053011 A | 5/2017 |
|---|---|---|
| KR | 10-1766966 B1 | 8/2017 |
| KR | 10-1958882 B1 | 3/2019 |

*Primary Examiner* — Maria Laios
*Assistant Examiner* — Adam J Francis
(74) *Attorney, Agent, or Firm* — Harness, Dickey & Pierce, P.L.C.

(57) ABSTRACT

There is provided an apparatus for folding a pouch for a secondary battery, the apparatus including: a forming means configured to gradually bend and fold an edge of a pouch-type secondary battery so that the edge has a target cross-sectional shape; a support means configured to support the forming means; and first to fourth gap spacers having various thicknesses, formed in a flat plate shape, and configured to be interposed between the forming means and the support means to align the forming means.

9 Claims, 4 Drawing Sheets

APPARATUS FOR FOLDING POUCH FOR SECONDARY BATTERY

CROSS-REFERENCE TO RELATED APPLICATIONS

This application claims the priority of Korean Patent Application No. KR 10-2020-0027191 filed on Mar. 4, 2020, in the Korean Intellectual Property Office, the disclosure of which is incorporated herein by reference.

FIELD

The present disclosure relates to an apparatus for folding a pouch for a secondary battery, the apparatus being capable of folding an edge (terrace) of a pouch-type secondary battery.

BACKGROUND

This section provides background information related to the present disclosure which is not necessarily prior art.

In general, a pouch-type secondary battery 1 includes an electrode assembly 2, a pouch casing 3 configured to receive the electrode assembly 2, and electrode tabs 4 extending and protruding from the electrode assembly 2.

Further, the pouch casing 3 includes a casing main body 5 configured to provide a space that may receive the electrode assembly 2, and a casing cover 6 configured to cover the casing main body 5. In this case, edges of the casing main body 5 and the casing cover 6 are typically sealed.

In addition, a sealed edge 7 of the pouch-type secondary battery 1, that is, the edge (terrace) 7 from which the electrode tab 4 is not exposed is folded in order to prevent corrosion occurring at the sealed portion, improve rigidity of the pouch, and reduce an overall size of the pouch-type secondary battery 1 to minimize a space occupied by the pouch-type secondary battery 1.

Meanwhile, examples of an apparatus for folding the edge 7 of the pouch-type secondary battery 1 are disclosed in Korean Patent Application Laid-Open No. 10-2017-0053011, Korean Patent No. 10-1766966, Korean Patent No. 10-1958882, and the like.

Each of the above-mentioned folding apparatuses disclosed in the patent documents gradually folds the edge 7 of the pouch-type secondary battery 1 while passing the edge 7 of the pouch-type secondary battery 1 so that the edge 7 has a target cross-sectional shape. The edge 7 of the pouch-type secondary battery 1 is gradually folded while passing multiple forming rolls continuously arranged in parallel.

However, the above-mentioned folding apparatuses have a problem that requires a large amount of time and manpower because the positions of the forming rolls need to be individually aligned one by one.

In addition, the above-mentioned folding apparatuses have a problem in that the alignment positions of the forming rolls vary depending on skill of operators, and this problem causes another problem that the edge 7 of the pouch-type secondary battery 1 cannot be folded to have a target cross-sectional shape or reliability of the folding apparatus deteriorates due to a jam or tear.

DOCUMENTS OF RELATED ART

Patent Documents

Korean Patent Application Laid-Open No. 10-2017-0053011

Korean Patent No. 10-1766966
Korean Patent No. 10-1958882

SUMMARY

An object of the present disclosure is to provide an apparatus for folding a pouch for a secondary battery, the apparatus being capable of enabling anyone, even an inexperienced operator, to easily, simply, and quickly align forming rolls and a folding guide.

This section provides a general summary of the disclosure and is not a comprehensive disclosure of its full scope or all of its features.

An aspect of the present disclosure provides an apparatus for folding a pouch for a secondary battery, the apparatus including: a forming means configured to gradually bend and fold an edge of a pouch-type secondary battery so that the edge has a target cross-sectional shape; a support means configured to support the forming means; and first to fourth gap spacers having various thicknesses, formed in a flat plate shape, and configured to be interposed between the forming means and the support means to align the forming means.

In the apparatus for folding a pouch for a secondary battery according to one aspect of the present disclosure, the support means may include: a base plate horizontally extending in a direction in which the pouch-type secondary battery travels; and a stand fixedly mounted on an upper surface of the base plate, in which the stand may include: a support plate horizontally extending in a longitudinal direction of the base plate and fixedly mounted on the base plate; and a mounting plate extending in a longitudinal direction of the support plate and vertically extending to an upper portion of the support plate, and in which one side of the mounting plate may be sequentially divided into a first forming region, a second forming region, and a third forming region in the direction in which the pouch-type secondary battery travels.

In the apparatus for folding a pouch for a secondary battery according to one aspect of the present disclosure, the forming means may include: a first forming part supported in the first forming region and having roll formers each having a pair of upper and lower forming rolls configured to bend the edge of the pouch-type secondary battery so that the edge has an acute angle; a second forming part supported in the second forming region and having roll formers each having a pair of upper and lower forming rolls configured to bend the edge of the pouch-type secondary battery unloaded from the first forming part so that the edge has an obtuse angle; and a third forming part supported in the third forming region and having roll formers each having a pair of upper and lower forming rolls configured to bend the edge of the pouch-type secondary battery unloaded from the second forming part so that the edge is horizontal.

In the apparatus for folding a pouch for a secondary battery according to one aspect of the present disclosure, the upper forming rolls and the lower forming rolls of the roll formers of the first forming part, the lower forming rolls of the roll formers of the second forming part, and the upper forming rolls and the lower forming rolls of the roll formers of the third forming part may be rotatably mounted on the mounting plate, the upper forming rolls of the roll formers of the second forming part may be rotatably mounted on a lower portion of a saddle horizontally extending in a longitudinal direction of the stand in the second forming region, a folding guide may be mounted on one surface of the saddle, and the folding guide may support a non-bent portion and a bent portion of the edge when the edge is bent by the roll formers of the second forming part.

In the apparatus for folding a pouch for a secondary battery according to one aspect of the present disclosure, the first gap spacer may be vertically interposed between the mounting plate and the upper forming rolls and the lower forming rolls of the roll formers of the first forming part in the first forming region.

In the apparatus for folding a pouch for a secondary battery according to one aspect of the present disclosure, the first gap spacer may be vertically interposed between the mounting plate and the lower forming rolls of the roll formers of the second forming part in the second forming region.

In the apparatus for folding a pouch for a secondary battery according to one aspect of the present disclosure, the first gap spacer may be vertically interposed between the mounting plate and the upper forming rolls and the lower forming rolls of the roll formers of the third forming part in the third forming region.

In the apparatus for folding a pouch for a secondary battery according to one aspect of the present disclosure, the second gap spacer may be horizontally interposed between the support plate and a column extending vertically downward from the other surface of the saddle and fixed at the other side of the mounting plate.

In the apparatus for folding a pouch for a secondary battery according to one aspect of the present disclosure, the third and fourth gap spacers may be disposed in a mounting groove portion formed in one surface of the saddle on which the folding guide is mounted, the third gap spacer may be horizontally interposed between an upper surface of the mounting groove portion and an upper surface of the folding guide, and the fourth gap spacer may be vertically interposed between a lateral surface of the mounting groove portion and the other surface of the folding guide.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Exemplary embodiments of the present invention will now be described in detail with reference to the accompanying drawings.

Hereinafter, exemplary embodiments of an apparatus for folding a pouch for a secondary battery according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conforms to the technical spirit of the present disclosure without being limited to a dictionary meaning when recognizing the intrinsic technical spirit of the present disclosure.

Figure 1:
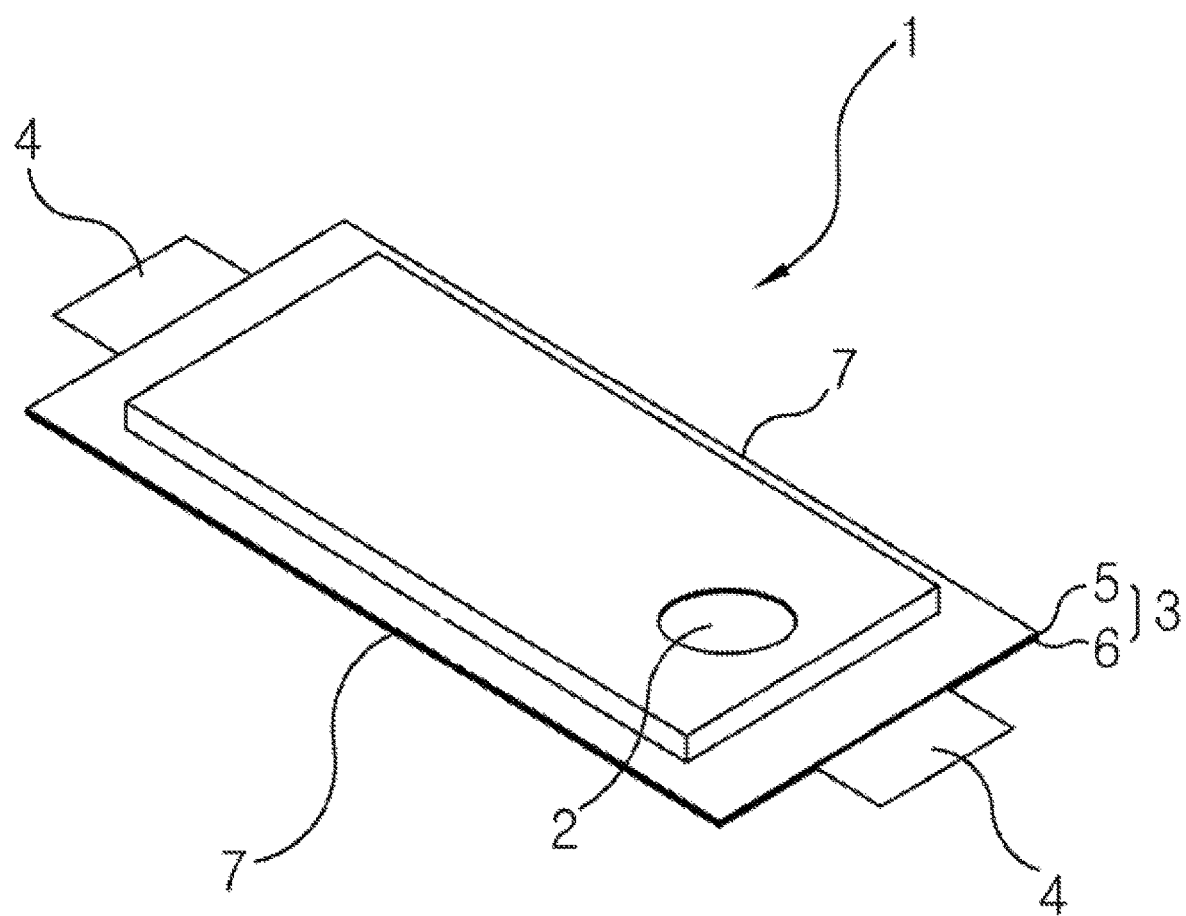
FIG. 1 is a view illustrating a pouch-type secondary battery related to the present disclosure.

An apparatus 100 for folding a pouch for a secondary battery according to the present disclosure gradually bends an edge (terrace) 7 of a pouch-type secondary battery 1 (see FIG. 1) mounted on a transfer robot (not illustrated) and continuously supplied from a previous process, thereby folding the edge 7 of the pouch-type secondary battery 1 so that the edge 7 has a predetermined (target) cross-sectional shape.

To this end, one or more apparatuses 100 for folding a pouch for a secondary battery according to the present disclosure are installed at one side or both sides of a traveling route of the pouch-type secondary battery 1 that travels along with the transfer robot.

As an example, two apparatuses 100 for folding a pouch for a secondary battery according to the present disclosure may be installed on the traveling route so as to be spaced apart from each other. In this case, the previous folding apparatus 100 may fold the edge 7 of the pouch-type secondary battery 1 at 180 degrees, and the subsequent folding apparatus 100 may fold the edge 7 of the pouch-type secondary battery 1, which is folded at 180 degrees, at 270 to 360 degrees.

In addition, in order to fold the edge 7 of the pouch-type secondary battery 1, which is folded at 360 degrees, at 360 degrees or more, for example, 450 degrees, a further apparatus 100 for folding a pouch for a secondary battery according to the present disclosure may be installed.

Figure 2:
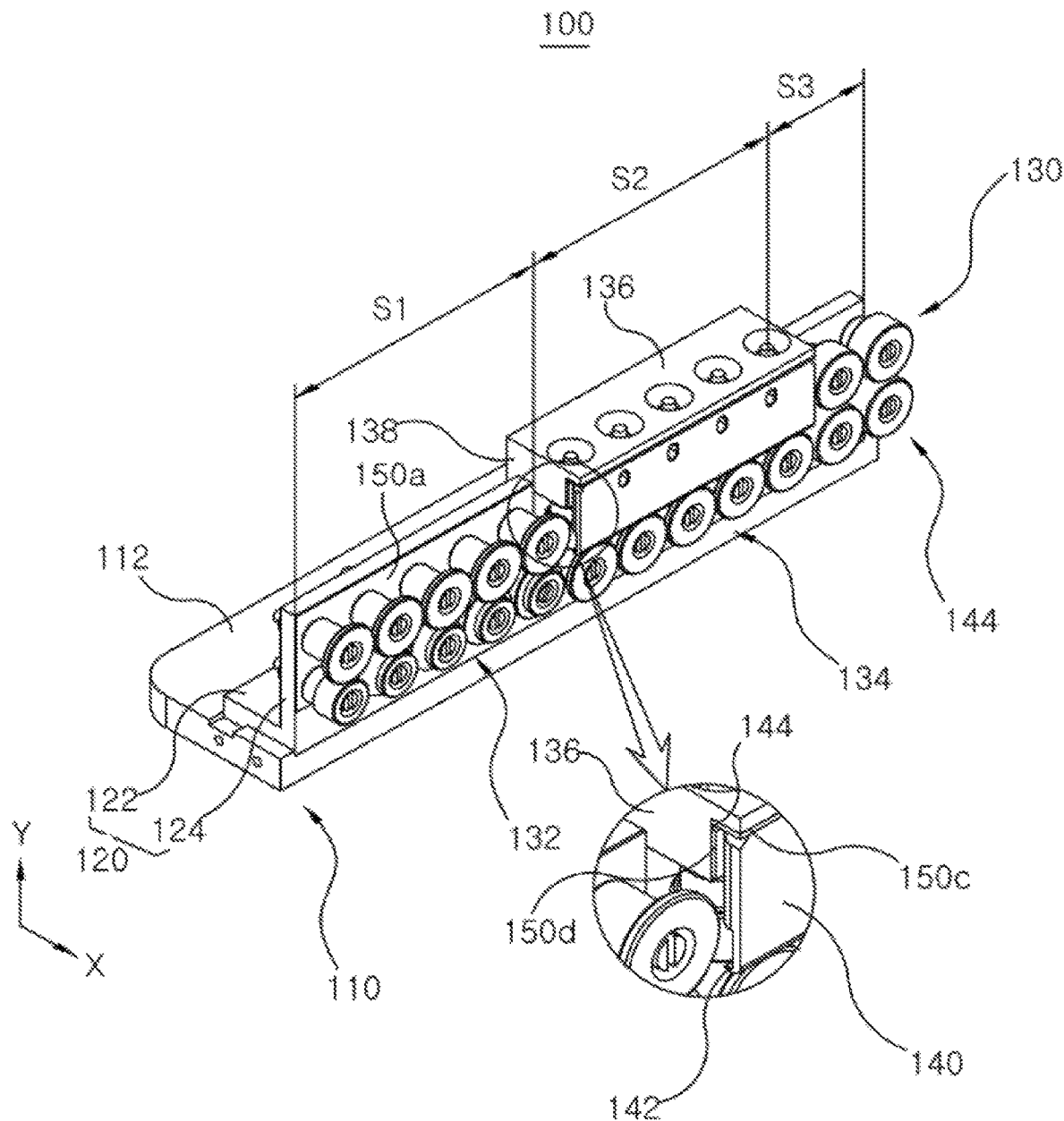
FIG. 2 is a perspective view illustrating an apparatus for folding a pouch for a secondary battery according to the present disclosure.
Figure 3:
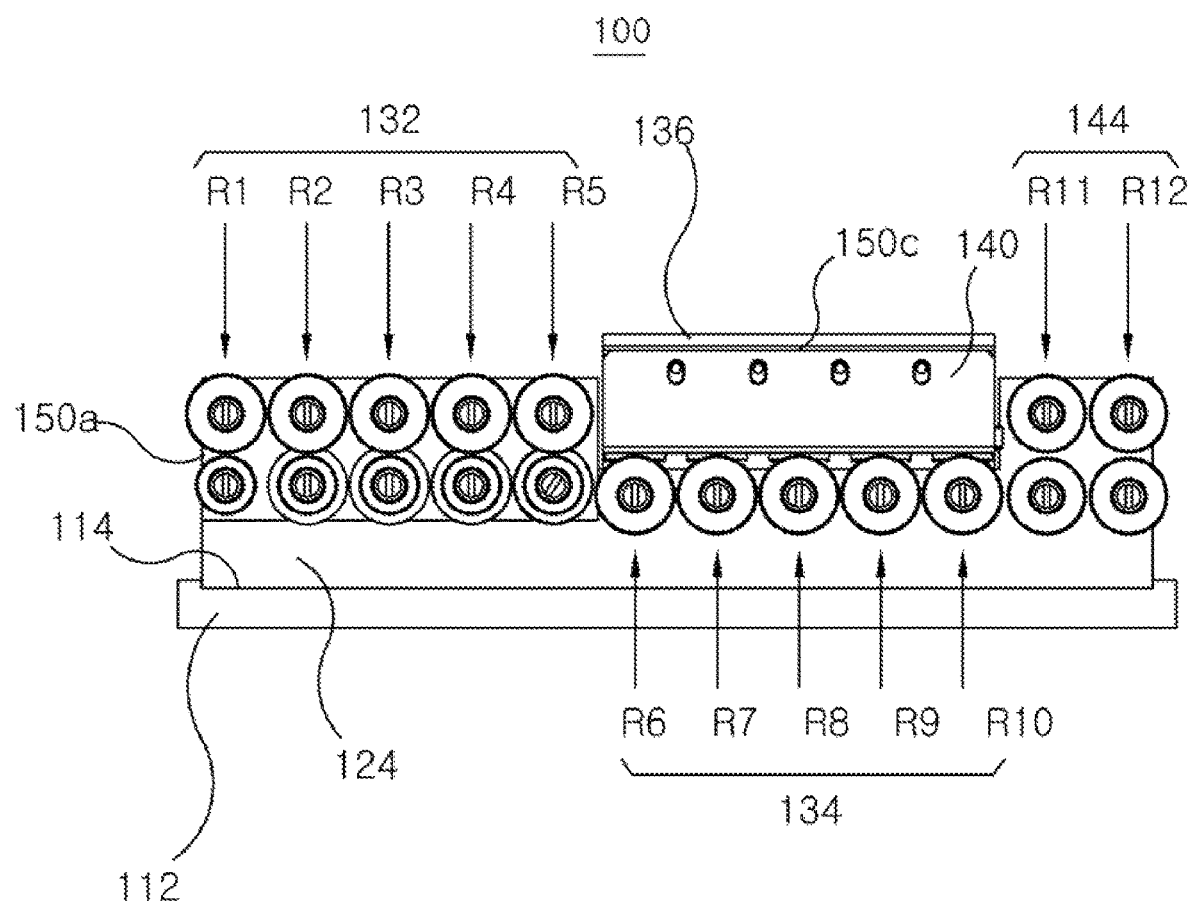
FIG. 3 is a front view illustrating the apparatus for folding a pouch for a secondary battery according to the present disclosure.
Figure 4:
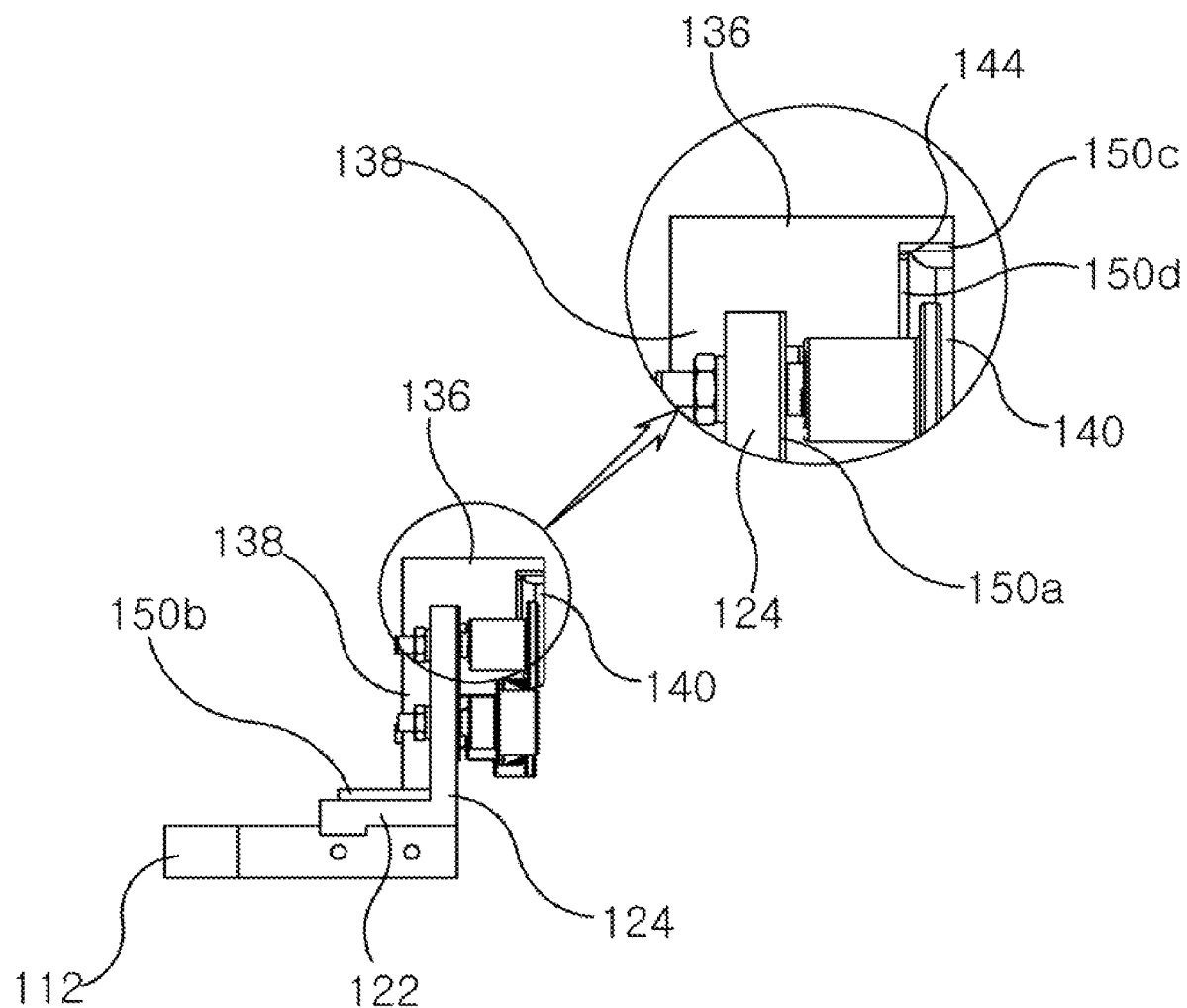
FIG. 4 is a side view illustrating the apparatus for folding a pouch for a secondary battery according to the present disclosure.

Among the accompanying drawings, FIGS. 2 to 4 are views illustrating the apparatus 100 for folding a pouch for a secondary battery according to the present disclosure. The apparatus 100 for folding a pouch for a secondary battery according to the present disclosure includes a forming means 130 configured to bend the edge 7 of the pouch-type secondary battery 1, and a support means 110 configured to support the forming means 130.

First, the support means 110 includes a base plate 112 and a stand 120 separately provided for convenience of processing.

The base plate 112 horizontally extends in a direction in which the pouch-type secondary battery 1 travels, and a stand 120 is fixedly mounted on an upper portion of the base plate 112.

As illustrated, the stand 120 includes a support plate 122 horizontally extending in a longitudinal direction of the base plate 112, and a mounting plate 124 extending in a longitudinal direction of the support plate 122 and vertically extending to an upper portion of the support plate 122.

In this case, a seating groove portion 114, in which the support plate 122 of the stand 120 is seated, is provided in an upper portion of the base plate 112. The support plate 122 of the stand 120 is fixedly mounted on the base plate 112 by means of a typical bolt and a typical nut in the state in which the support plate 122 is seated in the seating groove portion 114.

Since the support plate 122 of the stand 120 is fixedly mounted on the base plate 112 in the state in which the support plate 122 is seated in the seating groove portion 114 of the base plate 112 as described above, it is possible to minimize a sway of the stand 120 caused by vibration when folding the edge 7 of the pouch-type secondary battery 1.

Meanwhile, one surface of the mounting plate 124 of the stand 120 faces the edge 7 of the pouch-type secondary battery 1 which is to be bent, and one side of the mounting plate 124 is sequentially divided into a first forming region S1, a second forming region S2, and a third forming region S3 in the direction in which the pouch-type secondary battery 1 travels.

The forming means 130 includes a first forming part 132, a second forming part 134, and a third forming part 144 which allow the edge 7 of the pouch-type secondary battery 1 to be sequentially folded.

The first forming part 132 is disposed in the first forming region S1 provided at one side of the mounting plate 124 of the stand 120. The first forming part 132 bends the edge 7 of the pouch-type secondary battery 1 introduced in a horizontal state, that is, supplied from the previous process and bends the edge 7 of the pouch-type secondary battery 1 of which the edge 7 is bent at 180 degrees, so that the edge 7 of the pouch-type secondary battery 1 has an acute angle.

To this end, the first forming part 132 includes multiple roll formers R1 to R5 disposed along a route through which the pouch-type secondary battery 1 travels. The respective roll formers R1 to R5 include upper forming rolls and lower forming rolls disposed vertically and rotatably mounted on the mounting plate 124.

That is, the edge 7 of the pouch-type secondary battery 1 is gradually bent to have an acute angle while passing between the upper forming rolls and the lower forming rolls of the roll formers R1 to R5 of the first forming part 132.

In this case, because the method of forming the edge 7 by using the roll formers R1 to R5 of the first forming part 132 is a publicly known technology, a detailed description thereof will be omitted.

In addition, in the present disclosure, the first forming part 132 having the five roll formers R1 to R5 is illustrated, but it is apparent to anyone that the number of roll formers R1 to R5 of the first forming part 132 is not limited to five.

The second forming part 134 is disposed in the second forming region S2 provided at one side of the mounting plate 124 of the stand 120. The second forming part 134 bends the edge 7 of the pouch-type secondary battery 1 unloaded from the first forming part 132, that is, the edge 7 of the pouch-type secondary battery 1 of which the edge 7 is bent to have an acute angle, so that the edge 7 of the pouch-type secondary battery 1 has an obtuse angle.

To this end, like the first forming part 132, the second forming part 134 includes multiple roll formers R6 to R10 disposed along the route through which the pouch-type secondary battery 1 travels. The respective roll formers R6 to R10 include upper forming rolls and lower forming rolls disposed vertically.

In this case, the lower forming rolls of the roll formers R6 to R10 of the second forming part 134 are rotatably mounted on the mounting plate 124, and the upper forming rolls of the roll formers R6 to R10 of the second forming part 134 are rotatably mounted on a saddle 136 provided on an upper portion of the mounting plate 124.

The saddle 136 is disposed in the second forming region S2 and horizontally extends in a longitudinal direction of the stand 120. A lower portion of the saddle 136 faces the lower forming rolls of the roll formers R6 to R10 of the second forming part 134. The upper forming rolls, which interact with the lower forming rolls of the roll formers R6 to R10 of the second forming part 134, are rotatably mounted on the lower portion of the saddle 136.

In other words, the lower forming rolls of the roll formers R6 to R10 of the second forming part 134, which are mounted on the mounting plate 124, are rotated about rotation axes extending in an X-axis direction, and the upper forming rolls of the roll formers R6 to R10 of the second forming part 134, which are mounted on the saddle 136, are rotated about rotation axes extending in a Y-axis direction.

Further, the saddle 136 on which the upper forming rolls of the roll formers R6 to R10 of the second forming part 134 are mounted is mounted on the upper portion of the mounting plate 124 by a column 138.

The column 138 extends vertically downward from a position opposite to the roll formers R6 to R10 of the second forming part 134, that is, from the other surface of the saddle 136. The column 138 is fixedly mounted on the other surface of the mounting plate 124 by means of a bolt and a nut.

That is, the edge 7 of the pouch-type secondary battery 1 unloaded from the first forming part 132 is gradually bent to have an obtuse angle while passing between the upper forming rolls and the lower forming rolls of the roll formers R1 to R5 of the second forming part 134.

In this case, because the method of forming the edge 7 by using the roll formers R6 to R10 of the second forming part 134 is a publicly known technology, a detailed description thereof will be omitted.

In addition, in the present disclosure, the second forming part 134 having the five roll formers R6 to R10 is illustrated, but it is apparent to anyone that the number of roll formers R6 to R10 of the second forming part 134 is not limited to five.

Meanwhile, the second forming part 134 further includes a folding guide 140 configured to support a non-bent portion of the edge 7 and support a bent portion of the edge 7 to prevent the bent portion from being wrinkled when bending the edge 7 of the pouch-type secondary battery 1 by using the roll formers R6 to R10.

As illustrated, the folding guide 140 has a vertical plate shape extending in a longitudinal direction of the saddle 136, and an upper portion of the folding guide 140 is fixedly mounted, by a bolt or the like, on a mounting groove portion 144 provided in one surface of the saddle 136.

Further, a lower end of the folding guide 140 extends toward the roll formers R6 to R10 of the second forming part 134. A cutting edge 142 is integrally formed at the lower end of the folding guide 140, and the cutting edge 142 extends between the upper forming rolls and the lower forming rolls of the roll formers R6 to R10 of the second forming part 134 and horizontally extends in the longitudinal direction of the stand 120.

In this case, because the configuration in which the non-bent portion and the bent portion of the edge 7 are supported by the upper forming rolls and the lower forming rolls of the roll formers R6 to R10 of the second forming part 134 and by the cutting edge 142 of the folding guide 140 is a publicly known technology, a detailed description thereof will be omitted.

The third forming part 144 is disposed in the third forming region S3 provided at one side of the mounting plate 124 of the stand 120. The third forming part 144 presses the edge 7 of the pouch-type secondary battery 1 unloaded from the second forming part 134, that is, the edge 7 of the pouch-type secondary battery 1 of which the edge 7 is bent to have an obtuse angle, so that the edge 7 of the pouch-type secondary battery 1 is horizontal.

To this end, the third forming part 144 includes multiple roll formers R11 and R12 disposed along the route through which the pouch-type secondary battery 1 travels, and the respective roll formers R11 and R12 include upper forming rolls and lower forming rolls disposed vertically and rotatably mounted on the mounting plate 124.

That is, the edge 7 of the pouch-type secondary battery 1 unloaded from the second forming part 134 is pressed to gradually become horizontal while passing between the upper forming rolls and the lower forming rolls of the roll formers R11 and R12 of the third forming part 144.

In this case, because the method of forming the edge 7 by using the roll formers R11 and R12 of the third forming part 144 is a publicly known technology, a detailed description thereof will be omitted.

In addition, in the present disclosure, the third forming part 144 having the two roll formers R11 and R12 is illustrated, but it is apparent to anyone that the number of roll formers R11 and R12 of the third forming part 144 is not limited to two.

Meanwhile, the apparatus 100 for folding a pouch for a secondary battery according to the present disclosure further includes first to fourth gap spacers 150a, 150b, 150c, and 150d having various thicknesses and each having a flat plate shape.

First, the first gap spacer 150a enables the upper forming rolls and the lower forming rolls of the roll formers R1 to R5 of the first forming part 132 to be quickly aligned.

To this end, the first gap spacer 150a is vertically interposed between one surface of the mounting plate 124 and the roll formers R1 to R5 of the first forming part 132 in the first forming region S1.

That is, in order to align the upper forming rolls and the lower forming rolls of the roll formers R1 to R5 of the first forming part 132, in a state in which the other surface of the first gap spacer 150a, which has a thickness corresponding to a length to be aligned, is tightly attached to one surface of the mounting plate 124 in the first forming region S1 as illustrated in FIG. 2, the upper forming rolls and the lower forming rolls of the roll formers R1 to R5 of the first forming part 132 are rotatably and tightly attached to one surface of the first gap spacer 150a, such that the upper forming rolls and the lower forming rolls of the roll formers R1 to R5 of the first forming part 132 are quickly aligned in the first forming region S1.

FIG. 2 illustrates the first gap spacer 150a interposed between the mounting plate 124 and the first forming part 132 in the first forming region S1. However, the first gap spacer 150a may be interposed between the mounting plate 124 and the lower forming rolls of the roll formers R6 to R10 of the second forming part 132 in the second forming region S2 and between the mounting plate 124 and the upper forming rolls and the lower forming rolls of the roll formers R11 and R12 of the third forming part 144 in the third forming region S3, thereby quickly aligning the lower forming rolls of the roll formers R6 to R10 of the second forming part 134 and the upper forming rolls and the lower forming rolls of the roll formers R11 and R12 of the third forming part 144.

Further, the second gap spacer 150b serves to quickly adjust heights of the upper forming rolls of the roll formers R6 to R10 of the second forming part 134. To this end, the second gap spacer 150b is horizontally interposed between the support plate 122 of the stand 120 and the lower portion of the column 138.

That is, in order to adjust the heights of the upper forming rolls of the roll formers R6 to R10 of the second forming part 134, the column 138 is fixedly mounted on the other surface of the mounting plate 124 in a state in which the second gap spacer 150b, which has a thickness corresponding to a height to be adjusted, is interposed between the support plate 122 of the stand 120 and the lower portion of the column 138, such that the heights of the upper forming rolls of the roll formers R6 to R10 of the second forming part 134 are quickly adjusted.

Meanwhile, the third and fourth gap spacers 150c and 150d enable a position of the cutting edge 142 of the folding guide 140 to be quickly adjusted.

To this end, the third gap spacer 150c is horizontally interposed between an upper surface of the mounting groove portion 144 and an upper surface of the folding guide 140, and the fourth gap spacer 150d is vertically interposed between a lateral surface of the mounting groove portion 144 and the other surface of the folding guide 140.

That is, in order to adjust the position of the cutting edge 142 of the folding guide 140, the folding guide 140 is fixedly mounted on the saddle 136 in a state in which the third gap spacer 150c and the fourth gap spacer 150d, which each have a thickness corresponding to a height and a length to be adjusted, are interposed between the upper surface of the mounting groove portion 144 and the upper surface of the folding guide 140 and between the lateral surface of the mounting groove portion 144 and the other surface of the folding guide 140, respectively, such that the position of the cutting edge 142 of the folding guide 140 is quickly adjusted.

In this case, the alignment and the height adjustment for the roll formers R1 to R12 of the first to third forming parts 132, 134, and 144 and the position adjustment for the cutting edge 142 of the folding guide 140 may be performed when the apparatus 100 for folding a pouch for a secondary battery according to the present disclosure is installed or when a size of the pouch-type secondary battery 1 of which the edge 7 is to be folded is changed.

The apparatus 100 for folding a pouch for a secondary battery according to the present disclosure configured as described above includes the first gap spacer 150a configured to be interposed between the mounting plate 124 and the first to third forming parts 132, 134, and 144, the second gap spacer 150b configured to be interposed between the support plate 122 of the stand 120 and the column 138, and the third and fourth gap spacers 150c and 150d configured to be interposed between the folding guide 140 and the saddle 136. As a result, anyone, i.e., even an inexperienced operator may easily align the positions of the roll formers R1 to R12 of the first to third forming parts 132, 134, and 144 and the position of the cutting edge 142 of the folding guide 140, thereby improving reliability of the folding apparatus 100 according to the present disclosure.

While the specific exemplary embodiments of the present invention have been described and illustrated, it is obvious to those skilled in the art that the present invention is not limited to the aforementioned exemplary embodiments, and may be variously changed and modified without departing from the spirit and the scope of the present invention. Therefore, the changed or modified examples should not be appreciated individually from the technical spirit or prospect of the present invention, and the modified examples belong to the claims of the present invention.

As set forth above, according to exemplary embodiments of the invention, there are provided the first gap spacer configured to be interposed between the mounting plate and the first to third forming parts, the second gap spacer configured to be interposed between the support plate of the stand and the column, and the third and fourth gap spacers configured to be interposed between the folding guide and the saddle. As a result, anyone, i.e., even an inexperienced operator may easily align the positions of the roll formers of the first to third forming parts and the position of the cutting edge of the folding guide, thereby improving reliability of the folding apparatus.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for folding a pouch for a secondary battery, the apparatus comprising:
a forming means configured to gradually bend and fold an edge of a pouch-type secondary battery so that the edge has a target cross-sectional shape;
a support means configured to support the forming means; and
first to fourth gap spacers having various thicknesses, formed in a flat plate shape, and configured to be interposed between the forming means and the support means to align the forming means.

2. The apparatus of claim 1, wherein the support means includes:
a base plate horizontally extending in a direction in which the pouch-type secondary battery travels; and
a stand fixedly mounted on an upper surface of the base plate,
wherein the stand includes:
a support plate horizontally extending in a longitudinal direction of the base plate and fixedly mounted on the base plate; and
a mounting plate extending in a longitudinal direction of the support plate and vertically extending to an upper portion of the support plate, and
wherein one side of the mounting plate is sequentially divided into a first forming region, a second forming region, and a third forming region in the direction in which the pouch-type secondary battery travels.

3. The apparatus of claim 2, wherein the forming means includes:
a first forming part supported in the first forming region and having roll formers each having a pair of upper and lower forming rolls configured to bend the edge of the pouch-type secondary battery so that the edge has an acute angle;
a second forming part supported in the second forming region and having roll formers each having a pair of upper and lower forming rolls configured to bend the edge of the pouch-type secondary battery unloaded from the first forming part so that the edge has an obtuse angle; and
a third forming part supported in the third forming region and having roll formers each having a pair of upper and lower forming rolls configured to bend the edge of the pouch-type secondary battery unloaded from the second forming part so that the edge is horizontal.

4. The apparatus of claim 3, wherein the upper forming rolls and the lower forming rolls of the roll formers of the first forming part, the lower forming rolls of the roll formers of the second forming part, and the upper forming rolls and the lower forming rolls of the roll formers of the third forming part are rotatably mounted on the mounting plate, the upper forming rolls of the roll formers of the second forming part are rotatably mounted on a lower portion of a saddle horizontally extending in a longitudinal direction of the stand in the second forming region, a folding guide is mounted on one surface of the saddle, and the folding guide supports a non-bent portion and a bent portion of the edge when the edge is bent by the roll formers of the second forming part.

5. The apparatus of claim 3, wherein the first gap spacer is vertically interposed between the mounting plate and the upper forming rolls and the lower forming rolls of the roll formers of the first forming part in the first forming region.

6. The apparatus of claim 3, wherein the first gap spacer is vertically interposed between the mounting plate and the lower forming rolls of the roll formers of the second forming part in the second forming region.

7. The apparatus of claim 3, wherein the first gap spacer is vertically interposed between the mounting plate and the upper forming rolls and the lower forming rolls of the roll formers of the third forming part in the third forming region.

8. The apparatus of claim 4, wherein the second gap spacer is horizontally interposed between the support plate and a column extending vertically downward from the other surface of the saddle and fixed at the other side of the mounting plate.

9. The apparatus of claim 4, wherein the third and fourth gap spacers are disposed in a mounting groove portion formed in one surface of the saddle on which the folding guide is mounted, the third gap spacer is horizontally interposed between an upper surface of the mounting groove portion and an upper surface of the folding guide, and the fourth gap spacer is vertically interposed between a lateral surface of the mounting groove portion and the other surface of the folding guide.

* * * * *